T. C. ZULICK.
Potato Digger.
No. 637, 31,641.
Patented Mar. 5, 1861.
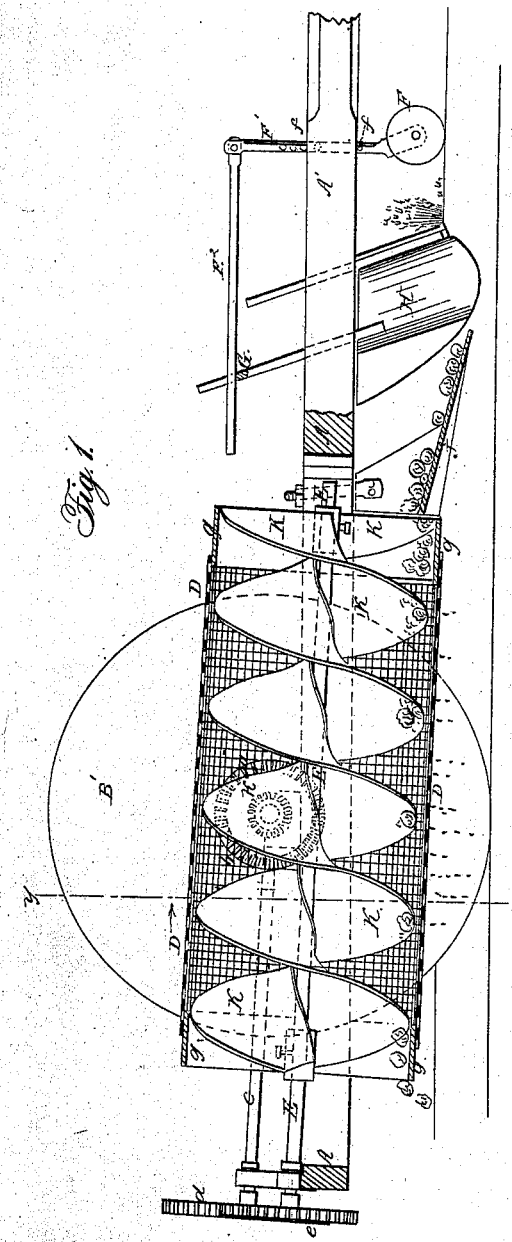
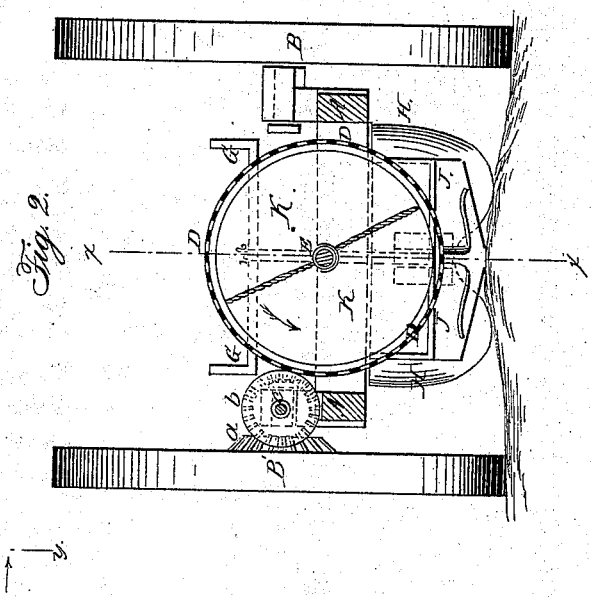
Witnesses:
Inventor:

UNITED STATES PATENT OFFICE.

T. C. ZULICK, OF SCHUYLKILL HAVEN, PENNSYLVANIA.

IMPROVEMENT IN POTATO-DIGGERS.

Specification forming part of Letters Patent No. 31,641, dated March 5, 1861.

*To all whom it may concern:*

Be it known that I, T. C. ZULICK, of Schuylkill Haven, in the county of Schuylkill and State of Pennsylvania, have invented a new and Improved Potato-Digger; and I do hereby declare that the following is a full, clear, and exact description thereof, reference being had to the accompanying drawings, making a part of this specification, in which—

Figure 1 is a longitudinal section through the improved potato-digging machine, taken in the vertical plane indicated by red line $xx$ in Fig. 2. Fig. 2 is an elevation of the rear end of the improved potato-digger.

Similar letters of reference indicate corresponding parts in both figures.

The object of this invention is to produce a machine which will dig up potatoes and other roots and separate the earth from them in a more effectual manner that has hitherto been done by machines employed for this purpose.

The nature of my invention and improvements in potato-diggers consists in arranging a rotating cylindrical sieve in a position inclining from the rear to the front end of the machine, and in employing, in combination with this cylinder, as a means for carrying the potatoes backward, a spiral propeller, as will be hereinafter explained.

To enable those skilled in the art to make and use my invention, I will proceed to describe its construction and operation.

A represents the frame of the machine, which is quadrangular, and which has a strong beam, A', projecting out a suitable distance from its front end. Frame A is mounted on two carriage-wheels, B B', each of which has a short axle, which is properly secured to the top of the frame A, about the middle of its length. The wheel B' is made a driving-wheel for rotating the cylindrical sieve D, and to this end a bevel-gear wheel, $a$, is secured to the inside of this wheel B', concentrically with its axis, the teeth of which bevel-wheel $a$ engage with a pinion bevel-wheel, $b$, on the forward end of a horizontal shaft, $c$, which has its bearings in suitable blocks secured to the top of frame A. Shaft $c$ carries on its rear end a large spur-wheel, $d$, which engages with a spur-wheel, $e$, on the shaft E of cylinder D, and gives a rapid motion to this cylinder. The front end or beam part of frame A is mounted on a caster-wheel, F, which is on the lower end of a perpendicular post, F', passing up through the beam A'. Post F' has a number of holes made transversely through it at suitable distances apart, which receive pins $ff$, for adjusting the beam to any required height above the ground. A rod, $F^2$, is pivoted to post F', which is used to turn the post in guiding the machine through the field.

G is a transverse rest for the rear end of rod $F^2$.

Behind the guide-wheel F are two wings, H H, which are suitably curved and made vertically adjustable for scraping off the surface soil from the potatoes. These wings H H are adjusted so that they will scrape the surface soil from above the potatoes and throw it on each side of the ridge; but the wings H H do not disturb the potatoes, leaving this work for the shovel J succeeding them. Shovel J has an inclined scoop-shaped plate which inclines from its rear to its front end. The width of this shovel-plate should be such that it will gather in it all the potatoes in a row at once going through the row. This inclined shovel-plate is connected to the frame A by two side plates, as shown in Figs. 1 and 2 of the drawings. The shovel J may be permanently secured to frame A, as it can be adjusted by raising or depressing the front of frame A, as before described.

Behind shovel J the rotating cylinder D is so arranged that the potatoes, mixed with loose earth and plowed up by the shovel J, will be discharged directly into the open front end of said cylinder. It should be here understood that the scraping-wings H H leave very little earth above the potatoes, so that the shovel discharges into the cylinder D only the earth which immediately surrounds the potatoes. Cylinder D is made up of a very coarse mesh-work of wires secured at each end of the cylinder to narrow cylindrical plates $g$ $g$. The driving-shaft E passes through the axis of cylinder D, and this shaft inclines from the rear end of frame to the front end thereof, as shown in Fig. 1 of the drawings, for the purpose of more thoroughly separating the earth from the potatoes, and also that a suitable receptacle may be placed under the rear end of this cylinder for receiving the cleaned potatoes. The cylinder D being inclined, as above described, it is necessary to provide some means for conveying the potatoes toward the rear end thereof as the cylinder is rotated. For this purpose a spiral or screw conveyer, K, is coiled around the shaft, and thus a spiral passage is formed within the cylinder D, extending from end to end of this cylinder. This spiral plate K receives the potatoes at the front end of cylinder D, and gradually moves them through the cylinder, keeping them at the same time in contact with the screen or sieve D, which allows all the earth to pass through it, leaving the potatoes to be discharged from the rear end of the cylinder.

Having thus described my invention, what I claim as new, and desire to secure by Letters Patent, is—

Combining with an inclined cylindrical screen, D, as herein described, the spiral or screw conveyer K, substantially as and for the purposes described.

T. C. ZULICK.

Witnesses:
W. H. LEVAN,
WM. A. LESSIG.